(12) United States Patent  (10) Patent No.: US 6,719,314 B1
Schote  (45) Date of Patent: Apr. 13, 2004

(54) WHEEL SUSPENSION FOR A FRONT AXLE OF AN AUTOMOBILE AND METHOD OF MAKING SAME

(75) Inventor: Norbert Schote, Ammerbuch (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 09/959,690

(22) PCT Filed: Apr. 14, 2000

(86) PCT No.: PCT/EP00/03374

§ 371 (c)(1),
(2), (4) Date: Mar. 28, 2002

(87) PCT Pub. No.: WO00/66377

PCT Pub. Date: Nov. 9, 2000

(30) Foreign Application Priority Data

May 3, 1999 (DE) ............................................ 19920106
Feb. 15, 2000 (DE) ............................................ 10006676

(51) Int. Cl.[7] ............................................... B60G 3/18
(52) U.S. Cl. ............................ 280/124.135; 280/124.15
(58) Field of Search .................. 280/124.134, 124.135, 280/124.136, 124.141, 124.143, 124.144, 124.15, 124.152

(56) References Cited

U.S. PATENT DOCUMENTS 2,039,671 A * 5/1936 Wagner ...................... 267/254
2,153,083 A * 4/1939 Griswold ............... 280/86.753

(List continued on next page.)

FOREIGN PATENT DOCUMENTS

DE 4012418 10/1991
EP 0655355 5/1995
EP 0656270 6/1995

OTHER PUBLICATIONS

Von Franz–Josef Paefgen, et al., "The New Audi A4" ATZ Automobile Magazine, Dec. 1994.
Von Ernst Muller, et al, "The Framework of New Audi 80" Automobile Magazine, 1992.
Copy of the search report.

Primary Examiner—Paul N. Dickson
Assistant Examiner—Laura B. Rosenberg
(74) Attorney, Agent, or Firm—Crowell & Moring LLP (57) ABSTRACT

A wheel suspension for a front axle of a motor vehicle, especially for an all-terrain vehicle, with a pulled-up drag bearing upon which double transverse links, which have the ability to swing and which are comprised of steering triangles, are positioned. The one transverse link is arranged above a wheel and the other transverse link and a steering tie rod as well as a stabilizer are arranged underneath a rotation axis of the wheel. A bearing on the side of the drag bearing side of the upper transverse link as well as a bearing of the steering tie rod on the drag bearing are arranged—in relation to the direction of movement—behind a vertical transverse plane of the center of the wheel. A corresponding additional bearing on the side of the drag bearing of the lower transverse link is arranged in front of the vertical transverse plane of the center of the wheel in such a way that a geometric swiveling axis or a trailing axis with piercing point in the wheel contact plane outside of the tread and in front of the vertical transverse plane of the center of the wheel results. The upper bearing on the side of the drag bearing and the lower transverse link with the steering tie rod form an elastokinematic swiveling axis that features a piercing point in the wheel contact plane behind the vertical transverse plane of the center of the wheel center plane and outside of the tread.

11 Claims, 6 Drawing Sheets

U.S. PATENT DOCUMENTS

| | | | | |
|---|---|---|---|---|
| 2,521,335 A | * | 9/1950 | Booth | 280/124.136 |
| 3,630,303 A | * | 12/1971 | Froumajou | 180/256 |
| 4,681,342 A | * | 7/1987 | Goerich | 280/124.143 |
| 4,863,188 A | * | 9/1989 | Killian | 280/124.138 |
| 4,951,959 A | * | 8/1990 | Watanabe et al. | 280/124.136 |
| 4,957,307 A | * | 9/1990 | Gandiglio | 280/124.141 |
| 5,114,176 A | * | 5/1992 | Sawai | 280/124.135 |
| 5,249,817 A | * | 10/1993 | Bruhl | 280/124.137 |
| 5,335,933 A | * | 8/1994 | Yamamoto et al. | 280/124.138 |
| 5,372,377 A | * | 12/1994 | Lee | 280/124.143 |
| 5,415,427 A | * | 5/1995 | Sommerer et al. | 280/124.142 |
| 5,435,591 A | * | 7/1995 | Lee | 280/124.139 |
| 5,496,055 A | | 3/1996 | Shibahata et al. | 280/124.141 |
| 5,513,874 A | * | 5/1996 | Mori | 280/93.51 |
| 5,516,130 A | * | 5/1996 | Mitchell | 280/124.134 |
| 5,938,219 A | * | 8/1999 | Hayami et al. | 280/124.135 |
| 5,954,353 A | * | 9/1999 | Kincaid et al. | 280/124.152 |
| 6,123,351 A | * | 9/2000 | Bruehl | 280/124.135 |

* cited by examiner

WHEEL SUSPENSION FOR A FRONT AXLE OF AN AUTOMOBILE AND METHOD OF MAKING SAME

BACKGROUND AND SUMMARY OF THE INVENTION

The invention relates to a wheel suspension for a front axle of a motor vehicle with a steering gear, in particular intended for an all-terrain vehicle, with a pulled up drag link, and the latter has double transverse links positioned on it, respectively, comprised of a steering triangle that is positioned with the ability to swing, and one of the transverse links is arranged above a wheel and the other transverse link is arranged with a steering tie rod as well as a stabilizer underneath a rotation axis of the wheel, and a geometric swiveling axis as well as an elastokinematic swiveling axis are generated.

In German Patent Document DE 40 12 418 A1, a wheel suspension is disclosed that is constructed as a double transverse link with a transverse link on the one side of a pulled up drag bearing, that is positioned, with the ability to swing, in a holder which is mounted on the side of the assembly, and which also supports the upper end of a MacPherson strut unit/shock absorber leg. The other end of the MacPherson strut unit/shock absorber leg is mounted on the other, lower transverse link that is coupled with the drag bearing. In addition, Matschinsky, W., "Wheel Guides for Road Vehicles," TÜV Rheinland Publishers, 1987, p. 246, FIG. 11.2, discloses a single-wheel suspension for steerable wheels with two transverse links, arranged one above the other, consisting of steering triangles mounted on the drag bearing, respectively, by way of a bearing. The bearings on the assembly side are mounted on axles that are arranged obliquely in relation to the longitudinal center axis of the vehicle.

The subject-matter of the invention comprises providing a wheel suspension for steerable wheels of a front axle of a motor vehicle that realizes a slightly understeered driving performance when going through curves or when going straight ahead, while forces act upon the wheel.

According to the invention, this objective is achieved with the characteristics of a bearing on the side of the drag bearing of the upper transverse link and a bearing of the steering tie rod are arranged on the drag bearing—in relation to the direction of movement—behind a vertical transverse plane of the center of the wheel; and wherein a corresponding other bearing on the side of the drag bearing of the lower transverse link is arranged—in relation to the direction of movement—in front of the vertical transverse plane of the center of the wheel; and wherein a geometric swiveling axis for steering the wheels or a trailing axis with a piercing point results in the wheel contact plane in close proximity or inside the tread and in front of the vertical transverse plane of the center of the wheel; and wherein a position is created for the elastokinematic swiveling axis by way of the upper bearing on the side of the drag bearing and by way of a pole formed by the radius vectors of the lower transverse link and the steering tie rod which—in relation to the direction of movement—runs behind the vertical transverse plane of the center of the wheel and outside of the tread through pole. Other advantageous characteristics are reflected in the preferred embodiments.

The primary advantages achieved with the invention are that the driving performance of the vehicle, especially of an all-terrain vehicle, remains slightly understeered when forces, such as braking forces, lateral forces and acceleration forces act upon the wheel. Major changes of the wheel position are to be avoided while these forces are acting upon the wheel because this can unfavorably affect the driving performance in curves as well as when driving straight ahead, and it can cause unstable driving performance.

In principle, these advantages are achieved by, in particular, the position of the elastokinematic swiveling axis of the wheel suspension is determined on the basis of the positioning of the upper and lower transverse links, one above the other, with respect to the vertical transverse plane of the center of the wheel and on the basis of the soft and hard identifications of the transversal swing arm bearings, adjusted in relation to each other, on the side of the assembly in radial and axial load directions.

The advantageous effects of the front wheel suspension are mainly achieved in that a bearing on the side of the drag bearing of the upper transverse link and a bearing of the steering tie rod are arranged on the drag bearing—in relation to the direction of movement—behind a vertical transverse plane of the center of the wheel. Furthermore, a corresponding, additional bearing on the side of the drag bearing of the lower transverse link—in relation to the direction of movement—is located in front of the vertical transverse plane of the center of the wheel. In particular, the geometric swiveling axis or the trailing axis will turn out to be with its piercing point in the wheel contact surface outside and close to the tread or close to the wheel plane and in front of the vertical transverse plane of the center of the wheel.

Radius vectors run through the bearing on the side of the drag bearing of the lower transverse link and through the bearing on the side of the draft bearing of the steering tie rod, forming a lower pole at their point of intersection for the elastokinematic swiveling axis which—in relation to the direction of movement—has a piercing point in the wheel contact surface plane behind the vertical transverse plane of the center of the wheel and close to the tread. The bearing on the side of the drag bearing of the upper transverse link forms an upper pole for the elastokinematic swiveling axis and thus helps determine the position of the swiveling axis. The radius vectors run along one of the front wheel guide arms of the lower transverse link and along the steering tie rod, which is why the direction of the radius vectors is predetermined.

Seen from a side view of the wheel, the shock absorber leg is arranged in a transverse plane with the trailing axis. Looking at the wheel from a front view, the center line of the shock absorber leg is arranged at a less steep angle in relation to the wheel contact plane than the trailing axis or the geometric swiveling axis. A shock absorber leg is mounted with its lower end on the lower transverse link, while the upper end is supported, with the ability to swing, in a step bearing. The latter is connected with the vehicle assembly and receives two bearings of the upper transverse link arranged on a swiveling axis.

To achieve the antidive effect and the antisquat effect, the swiveling axis of the two bearings on the side of the assembly of the upper transverse link—seen from a side view of the wheel—is—in relation to the direction of movement—inclined backward with regard to the wheel contact plane, and the swiveling axis of the two bearings on the side of the assembly of the lower transverse link is realized—in relation to the direction of movement—as ascending toward the back. In particular, a pitch pole results for an antidive and an antisquat above the wheel rotation axis, parallel to these axes due to vectors running through the bearings on the side of the drag bearing.

Based on the predetermined position of the geometric swiveling axis—around which the wheels are adjusted during a steering motion—and the elastokinematic swiveling axis, a position in relation to the wheel and in relation to the wheel contact surface becomes possible allowing for wheel position changes that facilitate a slightly understeered driving performance. Therefore, among other things, the two front bearings on the side of the assembly of the two transverse links—in relation to the direction of movement— are arranged closer to the vertical transverse plane of the center of the wheel than the two back bearings on the side of the assembly of the two transverse links, and they are assigned a harmonized radial and axial identification.

The elastokinematic movement of the wheel or of the wheel suspension under load and while driving occurs specifically in the longitudinal direction of the vehicle, especially for brake and acceleration forces. For this purpose, the bearings on the side of the assembly of the upper transverse link and of the lower transverse link have a softer identification in the axial load direction than in the radial load direction. The lower bearings on the side of the assembly of the transverse link have a harder identification vis-à-vis the upper bearings on the side of the assembly of the transverse link in the radial load direction. The bearings of the upper transverse link, on the other hand, have a softer axial identification than the other bearings of the lower transverse link. In particular, seen in the direction of movement, the front bearing of the upper transverse link can also be realized as rigid in the axial and radial directions, and it can form a pivot, with the back bearing having a soft identification in the radial direction.

An embodiment of the invention is illustrated in the drawings and will be described in greater detail below.

DETAILED DESCRIPTION OF THE DRAWINGS

A wheel suspension 1 for a front axle of a motor vehicle or an all-terrain vehicle is comprised of a pulled up drag bearing 2 which is coupled, respectively, with one transverse link 4, 5 by way of the bearing 6, 7 above and below a wheel rotation axis 3. For the purpose of positioning the transverse links, with the ability to swing, on the vehicle assembly, the transverse links 4, 5 are equipped with two drag bearings 8, 9 and 10, 11 each. A shock absorber leg 12 or a pneumatic spring is supported on the lower transverse link 5 via a fork element 19 or a similar element. The upper end of shock absorber leg 12, facing away, is fastened in a step bearing 13 that can be connected with the vehicle assembly. With respect to the direction of movement F, a steering tie rod 14 is envisioned behind the lower transverse link 5, which is connected, on the one hand, via a bearing 15 with drag bearing 2 and, on the other hand, with a steering device 16. Furthermore, a suspension gear 17 for a stabilizer 18 is linked to the drag bearing 2 via a bearing 17a. The stabilizer 18 is arranged in front of the lower transverse link 5 with respect to the direction of movement F.

Preferably, the upper transverse link 4 is fashioned as a one-piece steering triangle, equipped with a bearing 6 on the side of the drag bearing in order to form a geometric swiveling axis S or a trailing axis N (from a side view of the wheel R). This geometric swiveling axis is the wheel rotation axis. Corresponding to this bearing 6, an additional bearing 7 is envisioned on the lower transverse link 5. The geometric swiveling axis S of wheel R runs through these two bearings 6 and 7. This axis S has a piercing point 20 in the wheel contact plane 21. The piercing point is located close to the tread SP and—in relation to the direction of movement F—in front of the vertical transverse plane of the center of the wheel X-X. The tread is dependant on the tire/rim/press-in depth, i.e. the tread is smaller with some wheels, and it is larger with others, causing the piercing point to be positioned accordingly.

Figure 1:
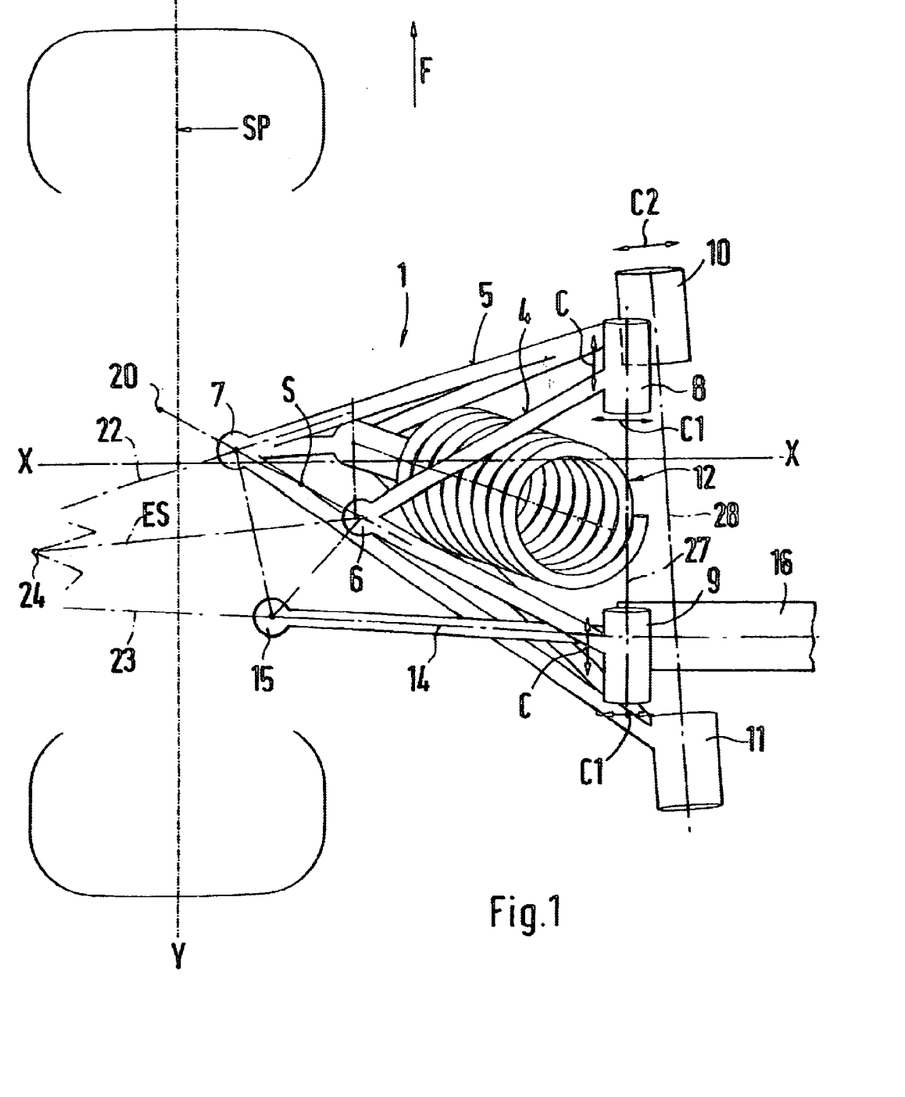
FIG. 1 shows a schematic depiction of a top view of a front axle wheel suspension.

An elastokinematic swiveling axis ES runs through the bearing 6 on the side of the drag bearing of the upper transverse link 4 and through a pole 24 that is formed by radius vectors 22, 23 as shown in FIG. 1. The one radius vector 22 runs through the bearing on the side of the drag bearing 7, and the other radius vector 23 runs through the bearing on the side of the drag bearing 15 of steering tie rod 14. The radius vector 22 extends from the bearing 7 all the way to the bearing 10, and the other radius vector 23 extends from bearing 15 along steering tie rod 14. The elastokinematic swiveling axis ES, running through pole 24 and the bearing 6, has a piercing point that lies outside the tread SP and—in relation to the direction of movement F—behind the vertical transverse place of the center of the wheel X—X.

Figure 5:
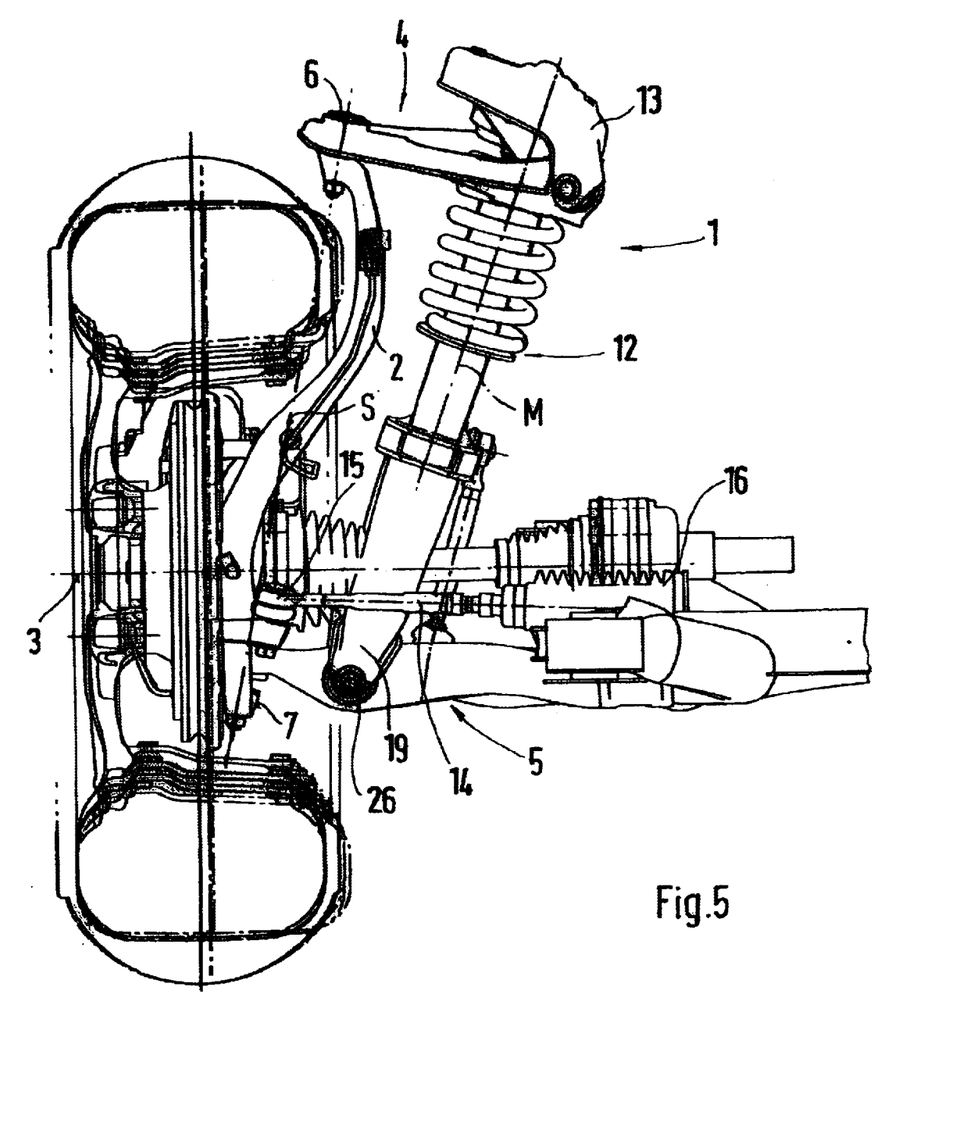
FIG. 5 shows a depiction of the wheel suspension, seen from the front.

The shock absorber leg 12 or a pneumatic spring is flexibly mounted on the transverse link 5 with its lower end, in particular, by way of a fork 19 reaching around a link part and reaching over a universal joint via the bearing 26 as shown in FIG. 5.

The upper end of shock absorber leg 12 is supported in a step bearing 13. The drag bearings 8, 9 of the upper transverse link 4 are also arranged there. The step bearing 13 is connected with the vehicle assembly.

Figure 2:
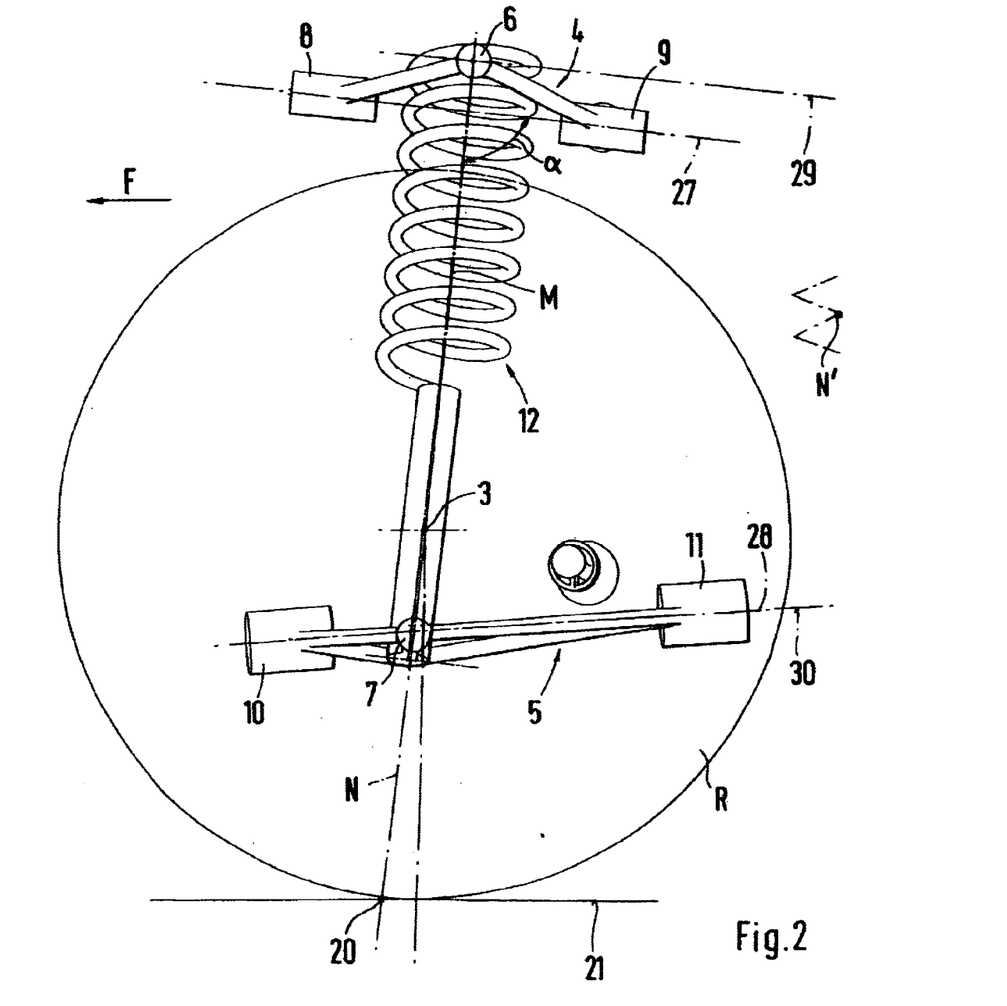
FIG. 2 shows a side view of the wheel suspension according to FIG. 1.
Figure 3:
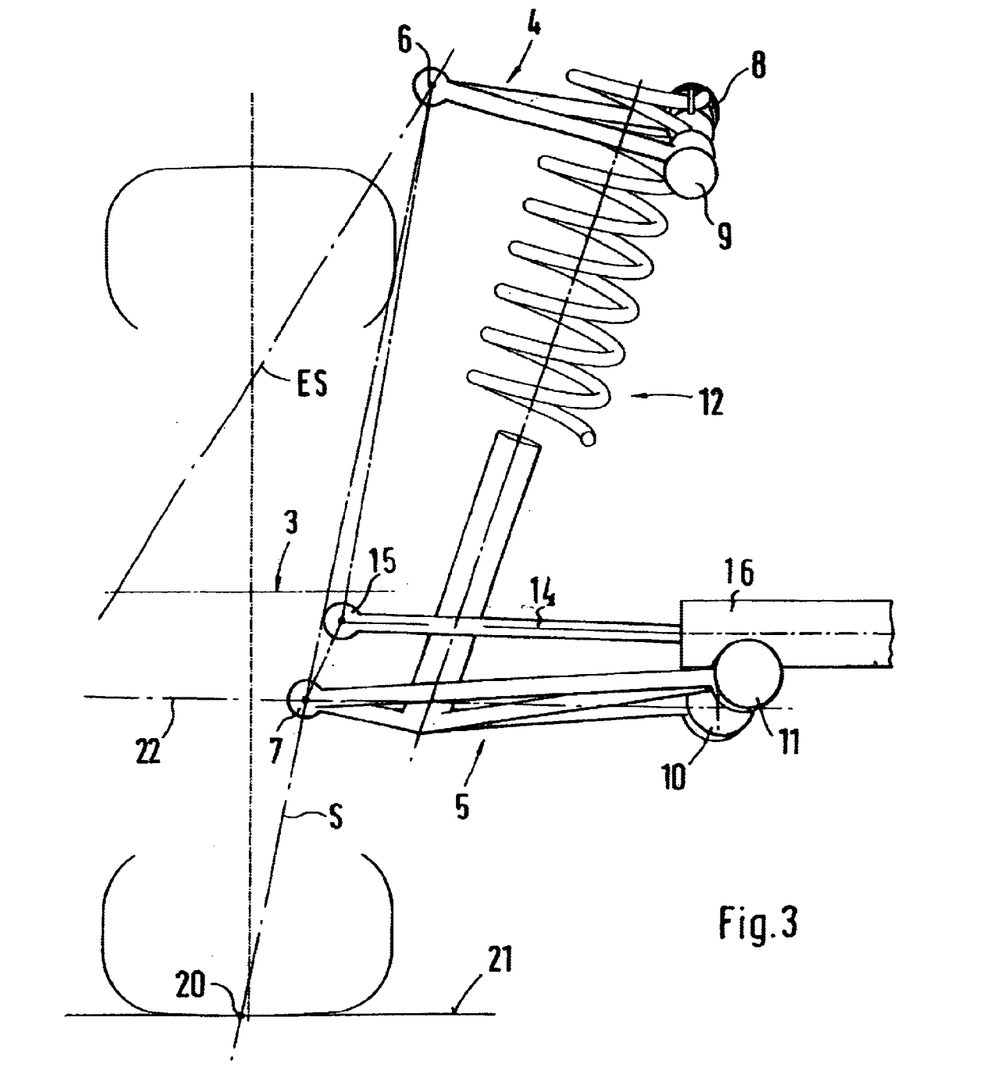
FIG. 3 shows a front view or rear view of the wheel suspension according to FIGS. 1 and 2.
Figure 4:
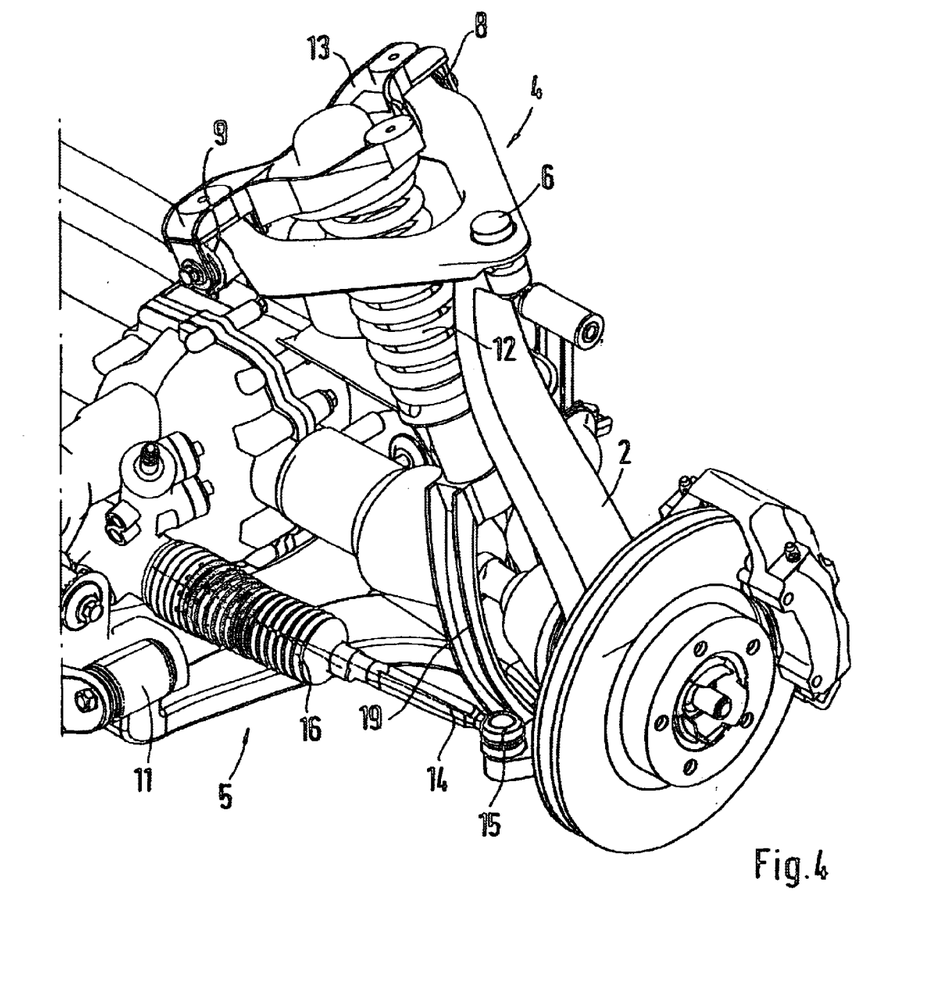
FIG. 4 shows a sketch of the front axle wheel suspension.

The two elastic bearings 8, 9 of transverse link 4 are held in position, with the ability to swing, on an axis 27. Axis 27 ascends in the direction of movement F and runs parallel to the vertical longitudinal plane of the center of the wheel Y—Y, if seen from a top view. The center axis M of shock absorber leg 12 is arranged at an approximately right angle in relation to the axis 27, which is illustrated in greater detail in FIG. 2.

To achieve an antidive effect and an antisquat effect, the swiveling axis 28 of the bearings 10, 11 of the lower transverse link 5 is realized as descending in relation to the direction of movement F in contrast to the swiveling axis 27, that is inclined downwards toward the back in relation to the direction of movement F. The radius vectors 29, 30 that form a pitch pole run, respectively, through the bearings on the side of the drag bearing 6, 7 and parallel in relation to the swiveling axes 27, 28. The pitch pole N' lies above the wheel rotation axis 3 and relatively far behind wheel R.

As can be seen in greater detail especially in FIG. 1, among other reasons, to achieve the position of the geometric swiveling axis S and of the elastokinematic swiveling axis ES, the two front drag bearings 8, 10 of the transverse links 4, 5 are—in relation to the direction of movement F—arranged in closer proximity to the vertical transverse plane of the center of the wheel X—X than the two back drag bearings 9, 11. The swiveling axes 27, 28 of the bearings on the side of the assembly 8, 9 and 10, 11 are running, in a top view, toward each other in the direction of movement.

The bearings on the side of the assembly 8, 9 and 10, 11 of transverse links 4, 5 feature corresponding identifications in the axial and radial directions for the purpose of achieving the elastokinematic, slight understeering movement of the wheel if forces such as braking forces, lateral forces and forces due to irregularities of the road surface act upon the wheel. Thus, the drag bearings on the side of the assembly 8, 9 of the upper transversal link 4 are realized in the axial load direction C with a softer identification than in the radial load direction C1. In this context, the drag bearings 8, 9 have a softer axial identification than the drag bearings 10 and 11. In contrast to drag bearings on the side of the assembly 8, 9 of the upper transverse link 4, the bearings on the side of the assembly 10, 11 of the lower transverse link 5 are realized with a harder identification in the radial load direction C2. In particular, the bearing 10 can be realized as rigid in the axial and in the radial directions, and the bearing 11 can be provided with a soft identification in the radial direction resulting in a movement of the wheel guide element 5 around bearing 10.

Figure 6:
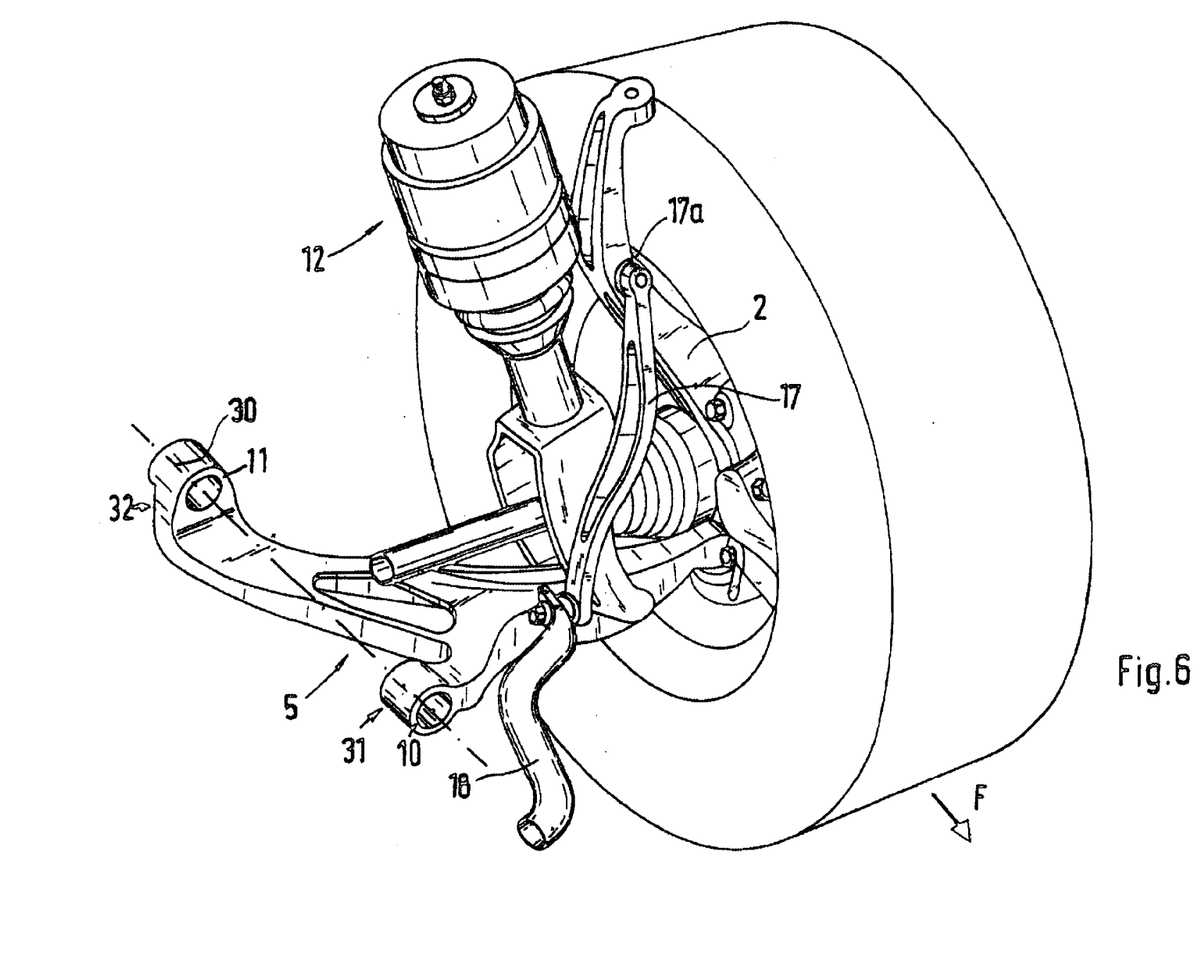
FIG. 6 shows a sketch of the wheel suspension with a lower transverse link and bearings on the side of the assembly as well as a linked shock absorber leg.

As shown in FIGS. 5 and 6, the shock absorber leg 12 or a pneumatic spring (not shown) extends with its upper end between two transversal swinging arms of the transverse link 4, and it receives a drive shaft between the lower fork. As illustrated in greater detail in FIG. 6, the lower transverse link 5 is equipped with an upright bearing eye 30 for the bearing 11 and with another bearing eye 32, provided in the plane of the transverse link 5, in order to receive a bearing.

What is claimed is:

1. A wheel suspension for a front axle of a motor vehicle with a steering gear, comprising:

a pulled-up drag link, the pulled-up drag link having double transverse links positioned thereon, which are swingable, and one of the transverse links being arranged above and the other transverse link with a steering tie rod being arranged underneath a rotation axis of the wheel, a geometric swiveling axis as well as an elastokinematic swiveling axis are created, a bearing on a side of the drag link of the upper transverse link and a bearing of the steering tie rod are located, in relation to a direction of movement, behind a vertical transverse plane of the center of the wheel, a corresponding additional bearing on the side of the drag link of the lower transverse link is arranged, in relation to the direction of movement, before the vertical transverse plane of the center of the wheel, and an upper end of a shock absorber leg is supported swingably in a step bearing that is connected to a vehicle assembly, the step bearing receiving two bearings on a side of the assembly, arranged on a link swiveling axis of the upper transverse link, wherein the link swiveling axis of the upper transverse link inclining downwards towards the back, in relation to the direction of movement, with respect to the wheel contact plane, and another link swiveling axis, formed by bearings on the side of the assembly of the lower transverse link is realized as ascending towards the back which results in a pitch pole for antidive and antisquat above the wheel rotation axis by virtue of radius vectors running parallel to both of the link swiveling axes and through the bearings on the side of the drag link, and wherein the two front bearings, in relation to the direction of movement, on the side of the assembly of the transverse links are arranged in closer proximity to the vertical transverse plane of the center of the wheel than the two back bearings on the side of the assembly of the transverse links.

2. A wheel suspension according to claim 1, wherein the link swiveling axes of the transverse links, as seen in a top view, are arranged as converging toward each other, in the direction of movement, wherein the link swiveling axis of the upper transverse link runs approximately parallel to a vertical longitudinal plane of the center of the wheel, and wherein the shock absorber leg is arranged approximately at a right angle in relation to the link swiveling axis of the upper transverse link.

3. A wheel suspension according to claim 2, wherein the bearings on the side of the assembly of the upper and lower transverse links feature in axial load directions a softer identification around a center position than in radial load directions, wherein the bearings on the side of the assembly of the upper transverse link have a softer axial identification than the bearings on the side of the assembly of the lower transverse link, and wherein the bearings on the side of the assembly of the lower transverse link feature a harder identification in relation to the bearings on the side of the assembly of the upper transverse link in a radial load direction.

4. A wheel suspension according to claim 2, wherein the front bearing on the side of the assembly of the lower transverse link is realized as rigid in radial and axial directions and forms a pivot, and wherein the other bearing on the side of the assembly of the lower transverse link is provided with a yielding identification in a radial direction.

5. A wheel suspension according to claim 1, wherein the bearings on the side of the assembly of the upper and lower transverse links feature in axial load directions a softer identification around a center position than in radial load directions, wherein the bearings on the side of the assembly of the upper transverse link have a softer axial identification than the bearings on the side of the assembly of the lower transverse link, and wherein the bearings on the side of the assembly of the lower transverse link feature a harder identification in relation to the bearings on the side of the assembly of the upper transverse link in a radial load direction.

6. A wheel suspension according to claim 5, wherein the front bearing on the side of the assembly of the lower transverse link is realized as rigid in radial and axial directions and forms a pivot, and wherein the other bearing on the side of the assembly of the lower transverse link is provided with a yielding identification in a radial direction.

7. A wheel suspension assembly for a vehicle, comprising:

a steering gear, a pulled-up drag link, a swingable upper transverse link having a bearing, a swingable lower transverse ling having a bearing, the upper and lower transverse links being positioned on the pulled-up drag link by the respective bearings, a steering tie rod arranged with the lower transverse link below a rotation axis of a wheel, a geometric swiveling axis and an elastokinematic swiveling axis being created, the bearing of the upper transverse link and a bearing of the steering tie rod being located, in relation to a direction of vehicle movement, behind a vertical transverse plane of the center of the wheel, the bearing of the lower transverse link being arranged, in relation to the direction of vehicle movement, forward of the vertical transverse plane of the center of the wheel, and a shock absorber leg having an upper end swingably supported in a step bearing, which is connected to a vehicle assembly, wherein a front drag bearing and a rear drag bearing of the upper transverse link form an upper link swiveling axis, the drag bearings of the upper link being received on the step bearing and the upper link swiveling axis inclining upwards in the direction of vehicle movement, wherein a front drag bearing and a rear drag bearing of the lower transverse link form a lower link swiveling axis, the lower link swiveling axis inclining downwards in the direction of vehicle movement so that a pitch pole for antidive and antisquat results above the wheel rotation axis by way of radius vectors running parallel to both of the link swiveling axes and through the bearings positioned on the drag link, and wherein the front drag bearings are arranged in closer proximity to the vertical transverse plane of the center of the wheel than the rear drag bearings.

8. A method of making a wheel suspension assembly for a vehicle with a steering gear, comprising:

positioning upper and lower swingable transverse links on a pulled-up drag link, arranging the lower link with a steering tie rod below a rotation axis of a wheel, creating a geometric swiveling axis and an elastokinematic swiveling axis, locating a bearing of the upper link on a side of the drag link and a bearing of the tie rod behind, in relation to a direction of movement, a vertical transverse plane of the center of the wheel, arranging a bearing of the lower link on the side of the drag link in front of the vertical transverse plane, swingably supporting an upper end of a shock absorber leg in a step bearing, which is connected to a vehicle assembly, connecting front and rear drag bearings of the upper link to the step bearing to form an upper link swiveling axis, the upper link swiveling axis inclining upwards in the direction of movement, and arranging front and rear drag bearings of the lower link on a side of the vehicle assembly to form a lower link swiveling axis, the lower link swiveling axis inclining downwards in the direction of movement thereby forming a pitch pole for antidive and antisquat above the wheel rotation axis by way of radius vectors running parallel to the link swiveling axes and through the bearings on the side of the drag link, wherein the front drag bearings are arranged in closer proximity to the vertical transverse plane than the rear drag bearings.

9. A method according to claim 8, wherein the link swiveling axes are arranged as converging in the direction of movement as viewed from above, wherein the upper link swiveling axis runs approximately parallel to a vertical longitudinal plane of the center of the wheel, and wherein the shock absorber leg is arranged at approximately a right angle to the upper link swiveling axis.

10. A method according to claim 8, wherein the drag bearings have, in axial load directions, a softer identification around a center position than in radial load directions, wherein the upper drag bearings have a softer axial identification than the lower drag bearings, and wherein the lower drag bearings have a harder identification than the upper drag bearings in a radial load direction.

11. A method according to claim 10, wherein the front lower drag bearing is rigid in the radial and axial directions and forms a pivot, and wherein the rear lower drag bearing has a yielding identification in the radial direction.

* * * * *